No. 680,501. Patented Aug. 13, 1901.
N. B. RIDDLE.
NUT LOCK.
(Application filed June 10, 1901.)
(No Model.)
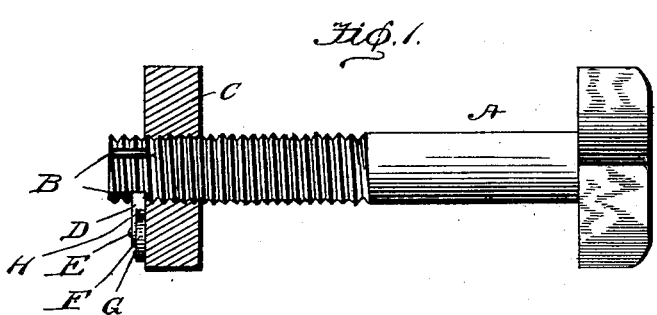
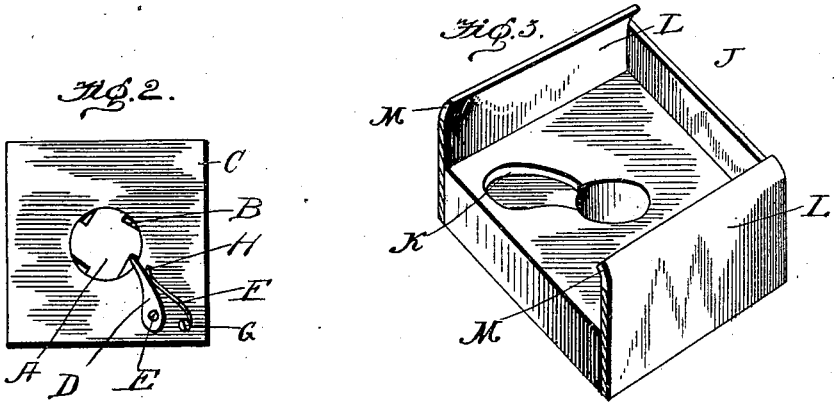
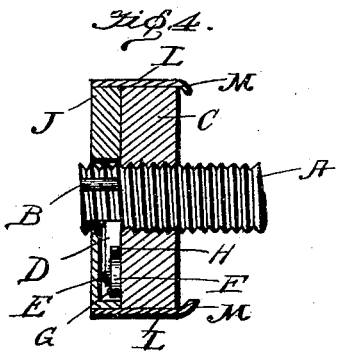
Witnesses
Bernard M. Offutt
A. S. Cassell
Napoleon B. Riddle, Inventor
by David P. Moore,
Attorney
THE NORRIS PETERS CO., PHOTO-LITHO., WASHINGTON, D. C.

UNITED STATES PATENT OFFICE.

NAPOLEON B. RIDDLE, OF RIDDLE, LOUISIANA.

NUT-LOCK.

SPECIFICATION forming part of Letters Patent No. 680,501, dated August 13, 1901.

Application filed June 10, 1901. Serial No. 63,884. (No model.)

*To all whom it may concern:*

Be it known that I, NAPOLEON B. RIDDLE, a citizen of the United States, residing at Riddle, in the parish of West Feliciana and State of Louisiana, have invented certain new and useful Improvements in Nut-Locks, of which the following is a specification.

This invention relates to improvements in nut-locks; and the main object of my invention is the provision of a nut and bolt lock which is adapted to be employed upon carriages or wagons, all classes of machinery, and in securing fish-plates to rails and one which cannot be loosened by jarring or striking and which will always under all conditions securely lock the nut.

Another object of my invention is the provision of a nut-lock which is the embodiment of simplicity, durability, and cheapness and is therefore a very useful and practical device.

To attain the desired objects, my invention consists of a nut-lock embodying novel features of constructions and arrangements of parts, substantially as disclosed herein.

In the drawings, Figure 1 is a side elevation of a bolt with a nut employing my lock in section thereon. Fig. 2 is a top plan view of the end of the bolt and nut with lock. Fig. 3 is a perspective view of a safety-cover which may be applied to the nut and bolt as a guard for the bolt and nut lock; and Fig. 4 is a sectional view of the upper end of a bolt, the nut and the cover in position.

Referring to the drawings, A designates a bolt, which is provided with the oppositely-arranged short longitudinal channels or recesses B, which only extend about one-quarter of an inch below the end of the bolt. Adapted to fit and screw upon the threads of the bolt is the nut C, which has pivoted to the upper face thereof the detent or dog D by means of the pin E. The free end of this detent is kept normally in engagement with the surface of the bolt by means of the small spring F, which is secured to the face of the nut by means of the pin G and has its free end H contacting the detent beyond the center thereof, so as to hold the free end in one of the channels or recesses of the bolt, and thus prevent any back turning of the nut.

From this description it will be seen that I provide a nut-lock which is very easily applied or detached when desired, but one which cannot accidentally allow the nut to become loose by jarring or striking the nut or bolt; but to further prevent the loosening or moving of the detent and also to provide a means to prevent anything becoming entangled with the end of the bolt or nut I employ the cap, cover, or casing J, which is provided with a recess K in the under side of the top plate of the casing to fit over the detent, and to prevent the cap or casing from becoming detached by the nut I provide the sides L thereof with the projecting inwardly-curved spring ends M, which are adapted to fit under the lower edge of two sides of the nut.

It is evident that I provide a nut-lock which is very simple, durable, and inexpensive and which is adapted to fill the place of a long-felt want, as it is such a useful and practical device.

Having fully described my invention, what I claim, and desire to secure by Letters Patent, is—

In a nut-lock, the combination of a bolt having its threaded end provided with a series of short grooves, a nut fitting upon said end, means carried by the nut to engage the grooves one at a time to lock the nut, and a cap or cover to fit over the end of the bolt and surround the nut comprising a top plate provided with a central opening and a recess, said recess adapted to fit over the locking means of the nut, two oppositely-arranged sides carried by the plate said sides projecting beyond the top plate the thickness of the nut, and two oppositely-arranged sides carried by the top plate and provided each with inturned projecting spring ends said ends extending beyond the lower side of the nut and holding the cap in place.

In testimony whereof I affix my signature in presence of two witnesses.

NAPOLEON B. RIDDLE.

Witnesses:
   J. B. MOUNT,
   A. H. SANDMAN.